United States Patent
Patil

(10) Patent No.: US 10,207,258 B2
(45) Date of Patent: Feb. 19, 2019

(54) POROUS CERAMIC BODY TO REDUCE EMISSIONS

(71) Applicant: Corning Incorporated, Corning, NY (US)

(72) Inventor: Mallanagouda Dyamanagouda Patil, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/738,434

(22) PCT Filed: Jun. 28, 2016

(86) PCT No.: PCT/US2016/039710
§ 371 (c)(1),
(2) Date: Dec. 20, 2017

(87) PCT Pub. No.: WO2017/003981
PCT Pub. Date: Jan. 5, 2017

(65) Prior Publication Data
US 2018/0169634 A1     Jun. 21, 2018

Related U.S. Application Data

(60) Provisional application No. 62/185,874, filed on Jun. 29, 2015.

(51) Int. Cl.
*F01N 3/28*     (2006.01)
*B01J 29/40*    (2006.01)
(Continued)

(52) U.S. Cl.
CPC .......... B01J 29/40 (2013.01); B01D 53/9445 (2013.01); B01D 53/9477 (2013.01);
(Continued)

(58) Field of Classification Search
CPC ................ B01D 53/945; B01D 53/944; B01D 39/2086; B01D 2255/206; B01D 2255/2073
(Continued)

(56) References Cited

U.S. PATENT DOCUMENTS 5,260,035 A   11/1993   Lachman et al.
5,334,570 A   8/1994    Beauseigneur et al.
(Continued)

FOREIGN PATENT DOCUMENTS

AU   199184574 A   4/1993
EP   0582971 B1    11/1997
(Continued)

OTHER PUBLICATIONS

Buhrmaster et al. "Evaluation of In-Line Adsorber Technology", 970267, SAE Publication, pp. 39-43, 1997.
(Continued)

*Primary Examiner* — Tom P Duong

(57) ABSTRACT

A porous ceramic honeycomb body including a substrate of intersecting porous walls forming axial channels extending from a first end face to a second end face. An active portion of the walls include a zeolite catalyst disposed inside pores thereof and/or is comprised of an extruded zeolite and a three way catalyst (TWC) is disposed on wall surfaces of at least a portion of the active portion.

19 Claims, 10 Drawing Sheets

(51) Int. Cl.
| | |
|---|---|
| B01J 37/02 | (2006.01) |
| B01J 23/63 | (2006.01) |
| B01J 35/04 | (2006.01) |
| B01J 37/00 | (2006.01) |
| C04B 38/00 | (2006.01) |
| F01N 3/10 | (2006.01) |
| F01N 13/00 | (2010.01) |
| B01D 53/94 | (2006.01) |
| C04B 35/18 | (2006.01) |
| C04B 35/447 | (2006.01) |
| B01J 29/08 | (2006.01) |
| B01J 29/18 | (2006.01) |
| B01J 29/70 | (2006.01) |
| B01J 29/82 | (2006.01) |
| B01J 35/00 | (2006.01) |
| B01J 35/10 | (2006.01) |
| F01N 3/08 | (2006.01) |
| C04B 111/00 | (2006.01) |

(52) U.S. Cl.
CPC .......... *B01D 53/9486* (2013.01); *B01J 23/63* (2013.01); *B01J 29/08* (2013.01); *B01J 29/084* (2013.01); *B01J 29/18* (2013.01); *B01J 29/70* (2013.01); *B01J 29/7007* (2013.01); *B01J 29/7011* (2013.01); *B01J 29/7034* (2013.01); *B01J 29/82* (2013.01); *B01J 35/0006* (2013.01); *B01J 35/0026* (2013.01); *B01J 35/04* (2013.01); *B01J 35/1076* (2013.01); *B01J 37/0009* (2013.01); *B01J 37/0244* (2013.01); *B01J 37/0246* (2013.01); *C04B 35/18* (2013.01); *C04B 35/447* (2013.01); *C04B 38/0006* (2013.01); *C04B 38/0009* (2013.01); *C04B 38/0051* (2013.01); *F01N 3/101* (2013.01); *F01N 3/2828* (2013.01); *F01N 13/0093* (2014.06); *B01D 2255/1021* (2013.01); *B01D 2255/1023* (2013.01); *B01D 2255/1025* (2013.01); *B01D 2255/2061* (2013.01); *B01D 2255/2063* (2013.01); *B01D 2255/2065* (2013.01); *B01D 2255/2092* (2013.01); *B01D 2255/20715* (2013.01); *B01D 2255/50* (2013.01); *B01D 2255/504* (2013.01); *B01D 2255/9035* (2013.01); *B01D 2255/912* (2013.01); *B01J 2229/186* (2013.01); *C04B 2111/0081* (2013.01); *C04B 2111/00793* (2013.01); *C04B 2235/3205* (2013.01); *C04B 2235/3217* (2013.01); *F01N 3/0807* (2013.01); *F01N 2330/06* (2013.01); *F01N 2370/04* (2013.01); *F01N 2510/063* (2013.01); *Y02T 10/22* (2013.01)

(58) Field of Classification Search
USPC .................................................. 422/177, 180
See application file for complete search history.

(56) References Cited

U.S. PATENT DOCUMENTS

| | | | |
|---|---|---|---|
| 5,417,947 A | 5/1995 | Hertl et al. | |
| 5,492,679 A | 2/1996 | Ament et al. | |
| 5,531,068 A | 7/1996 | Kass et al. | |
| 5,582,003 A | 12/1996 | Patil et al. | |
| 5,587,137 A | 12/1996 | Swaroop et al. | |
| 5,603,216 A | 2/1997 | Guile et al. | |
| 5,687,565 A | 11/1997 | Modica et al. | |
| 5,772,972 A | 6/1998 | Hepburn et al. | |
| 5,787,707 A | 8/1998 | Hertl et al. | |
| 5,887,422 A | 3/1999 | Abe et al. | |
| 5,939,028 A | 8/1999 | Bennett et al. | |
| 6,089,014 A | 7/2000 | Day et al. | |
| 6,192,324 B1 | 2/2001 | Lambert et al. | |
| 6,203,764 B1 | 3/2001 | Benson | |
| 6,617,276 B1 | 9/2003 | Ballinger et al. | |
| 6,767,855 B2 | 7/2004 | Kasahara et al. | |
| 6,840,984 B2 | 1/2005 | Bruck et al. | |
| 7,112,550 B2 | 9/2006 | Hiramoto et al. | |
| RE39,720 E | 7/2007 | Murphy et al. | |
| 7,618,699 B2 | 11/2009 | Beall et al. | |
| 7,762,059 B2 | 7/2010 | Zones et al. | |
| 7,837,978 B2 | 11/2010 | Burton, Jr. | |
| 7,858,059 B2 | 12/2010 | Davis et al. | |
| 7,927,682 B2 | 4/2011 | Beall et al. | |
| 8,057,568 B2 | 11/2011 | Zuberi et al. | |
| 8,413,433 B2 | 4/2013 | Lupescu | |
| 8,580,228 B2 | 11/2013 | Zones et al. | |
| 8,815,190 B2 | 8/2014 | Dotzel et al. | |
| 8,926,910 B2 | 1/2015 | Lupescu et al. | |
| 9,457,340 B2 | 10/2016 | Buelow et al. | |
| 2002/0183191 A1* | 12/2002 | Faber .................. | B01D 53/945 502/63 |
| 2004/0101453 A1 | 5/2004 | Fujiwara | |
| 2006/0029535 A1 | 2/2006 | Ott | |
| 2006/0188416 A1* | 8/2006 | Alward .............. | B01D 39/2086 422/180 |
| 2008/0241032 A1 | 10/2008 | Zuberi | |
| 2008/0317999 A1 | 12/2008 | Patchett et al. | |
| 2009/0143221 A1* | 6/2009 | Ogunwumi .......... | B01D 53/944 502/67 |
| 2009/0246103 A1 | 10/2009 | Ohno et al. | |
| 2011/0061371 A1 | 3/2011 | Cavataio et al. | |
| 2012/0260628 A1 | 10/2012 | Elangovan et al. | |
| 2013/0287659 A1 | 10/2013 | Lupescu et al. | |
| 2014/0044625 A1 | 2/2014 | Lupescu et al. | |
| 2014/0065042 A1 | 3/2014 | Andersen et al. | |

FOREIGN PATENT DOCUMENTS

| | | |
|---|---|---|
| ES | 2392989 B2 | 7/2013 |
| JP | 2000117021 A | 4/2000 |
| JP | 2001096126 A | 4/2001 |
| JP | 2002154822 A | 5/2002 |
| JP | 2003033621 A | 2/2003 |
| JP | 2005160852 A | 6/2005 |
| JP | 3816113 B2 | 8/2006 |
| JP | 2006217995 A | 8/2006 |
| JP | 2007111310 A | 5/2007 |
| JP | 2008018303 A | 1/2008 |
| JP | 2009213997 A | 9/2009 |
| JP | 2012055501 A | 3/2012 |
| KR | 2003097229 A | 12/2003 |
| KR | 2013109093 A | 10/2013 |
| WO | 1995008702 A1 | 3/1995 |
| WO | 1999056859 A1 | 11/1999 |

OTHER PUBLICATIONS

Hertl et al. "Hydrocarbon Adsorber System for Cold Start Emissions" 960347, SAE Publication, pp. 93-105, 1996.
International Search Report and Written Opinion PCT/US2016/039710 dated Sep. 20, 2016.
Kosaburo and Shizhou, "A study on adsorber substrate to reduce exhaust HC from a gasoline engine (adsorption and desorption characteristics with composition and preparation of zeolite)", Nippon Kikai Gakkai Ronbunshu, B-hen (2004), 70(689), 252-258. Language: Japanese, Database: CAPLUS, DOI:10.1299/kikaib.70. 252.
Ogunwumi et al. "In-Situ NH3 Generation for SCR NOx Applications" 2002-01-282, SAE Publication, 8 pgs. 2002.
Patil et al. "Airless In-Line Adsorber System for Reducing Cold Start HC Emissions" 980419, SAE Publication, 8 pgs, 1998.
Patil et al. "In-Line Hydrocarbon Adsorber System for ULEV" 960348, SAE Publication, pp. 107-124, 1996.

(56) References Cited

OTHER PUBLICATIONS

Tischer et al. "Three-Way-Catalyst Modeling—A Comparison of 1D and 2D Simulations" 2007-01-1071, SAE Publication, 7 pgs, 2007.
Williams et al. "By-Pass Hydrocarbon Absorber System for ULEV" 960343, SAE Publication, pp. 57-67, 1996.
Winkler et al. "Modeling of SCR DeNOx Catalyst—Looking at the Impact of Substrate Attributes" 2003-01-0845, SAE Publication, 11 pgs, 2003.
Heimrich and Deviney, "Lean nitrogen oxide (NOx) catalyst evaluation and characterization" SAE Technical Paper Series (1993), SP-968, 185-194.
Iwachido et al. "Development of the NOx adsorber catalyst for use with high-temperature condition" SAE Technical Paper Series (2001),SP-1573, pp. 99-110.
Kim et al. "Temperature-Programmed Adsorption and Characteristics of Honeycomb Hydrocarbon Adsorbers" Industrial & Engineering Chemistry Research (2002), 41(25), 6589-6592.
Tran et al. "Development of rotor concentrator design model" Proceedings of the Air & Waste Management Association's Annual Conference & Exhibition, 94th, Orlando, FL, United States, Jun. 24-28, 2001 (2001), 1975-1983.
Yoo et al. "Preparation of NaX zeolite coated honeycomb adsorbents and it's carbon dioxide adsorption characteristics" Kongop Hwahak (2009), 20(6), 663-669.

\* cited by examiner

POROUS CERAMIC BODY TO REDUCE EMISSIONS

CROSS REFERENCE TO RELATED APPLICATIONS

This application is a national stage application under 35 U.S.C. § 371 of International Patent Application Serial No. PCT/US2016/039710 filed on Jun. 28, 2016, which claims the benefit of U.S. Provisional Patent Application No. 62/185,874 filed on Jun. 29, 2015, the contents of both are relied upon and incorporated herein by reference in their entireties.

BACKGROUND

Field

Exemplary embodiments of the present disclosure relate to porous ceramic bodies to reduce emissions, in particular porous ceramic bodies having zeolite adsorber in wall and three-way catalyst (TWC) on wall to reduce hydrocarbons and volatile organic components (HC/VOC) emissions, an exhaust gas system incorporating the same, and methods of manufacturing the same.

Discussion of the Background

After-treatment of exhaust gas from internal combustion engines may use catalysts supported on high-surface area substrates and, in the case of diesel engines and some gasoline direct injection engines, a catalyzed or non-catalyzed filter for the removal of carbon soot particles. Porous ceramic flow-through honeycomb substrates and wall-flow honeycomb filters may be used in these applications.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a porous ceramic body having zeolite disposed inside pores of walls of the porous ceramic body and three-way catalyst (TWC) disposed on wall surfaces of the porous ceramic body.

Exemplary embodiments of the present disclosure also provide a method of manufacturing a porous ceramic body having zeolite disposed inside pores of walls of the porous ceramic body and three-way catalyst (TWC) disposed on the wall surfaces of the porous ceramic body.

Exemplary embodiments of the present disclosure also provide an exhaust gas system including the porous ceramic body having zeolite disposed inside pores thereof and TWC disposed on wall surfaces thereof.

Additional features of the disclosure will be set forth in the description which follows, and in part will be apparent from the description, or may be learned by practice of the disclosure.

An exemplary embodiment discloses a porous ceramic body comprising a substrate of porous walls forming channels extending from a first end face to a second end face. The porous ceramic honeycomb body, comprises an in wall zeolite catalyst disposed inside pores of walls of a first portion of the walls, and a three way catalyst (TWC) disposed on wall surfaces of the first portion of the walls.

An exemplary embodiment also discloses a porous ceramic body comprising a substrate of porous walls forming channels extending from a first end face to a second end face. The porous ceramic honeycomb body, comprises a three way catalyst (TWC) disposed on wall surfaces of at least a portion of the walls, wherein the substrate comprises an extruded zeolite catalyst.

An exemplary embodiment also discloses a method of manufacturing a ceramic article. The method comprises extruding a zeolite catalyst porous ceramic body and disposing three way catalyst (TWC) on wall surfaces of the walls of the porous ceramic body.

An exemplary embodiment also discloses a method of manufacturing a ceramic article. The method comprises disposing zeolite catalyst inside pores in walls of a first portion of walls of a porous ceramic body; and disposing three way catalyst (TWC) on wall surfaces of at least a portion of the first portion of the walls of the porous ceramic body.

An exemplary embodiment also discloses an exhaust gas system. The exhaust gas system includes a housing having an inlet configured to accept an exhaust gas stream to be purified, the housing having a chamber configured to flow the exhaust gas stream through a porous ceramic honeycomb body to purify the exhaust gas stream, and the housing having an outlet configured to emit the purified exhaust gas stream. The porous ceramic honeycomb body disposed in the housing, comprises a substrate of porous walls forming channels extending from a first end face to a second end face. The porous ceramic honeycomb body comprises an in wall zeolite catalyst disposed inside pores of walls of a first portion of the walls and a three way catalyst (TWC) disposed on wall surfaces of at least a portion of the walls of the first portion of walls.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1A:
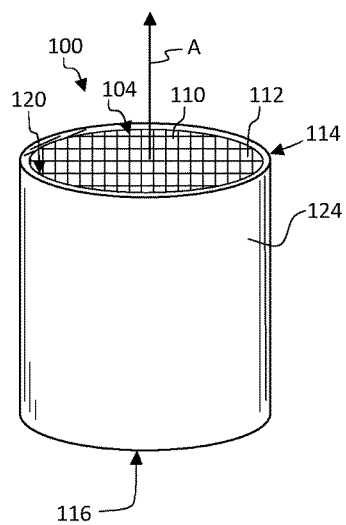
FIG. 1A shows a schematic perspective view of a honeycomb body comprising a skin on an outer periphery of a honeycomb core according to exemplary embodiments of the disclosure.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In these exemplary embodiments, the disclosed article, and the disclosed method of making the article provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

While terms such as, top, bottom, side, upper, lower, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, dimensions, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "ml" for milliliters, and "RT" for room temperature, "nm" for nanometers, and like abbreviations).

Specific values disclosed for components, ingredients, additives, times, temperatures, pressures, and like aspects, and ranges thereof, are for illustration only; they do not exclude other defined values or other values within defined ranges. The apparatus, and methods of the disclosure can include any value or any combination of the values, specific values, and more specific values described herein.

According to exemplary embodiments of this disclosure, an active material is disposed inside the pores of a substrate and a three-way catalyst (TWC) is disposed on the surfaces of the channel walls of the substrate as will be described in more detail below. In an exemplary embodiment, zeolite is disposed in the pores directly on the pore surfaces and the TWC is disposed directly on the wall surfaces.

An active material as used herein refers to material which can modify a gaseous mixture, by reaction with the mixture components, by catalytic activity, or by sorbing activity, or desorbing activity. The active material is preferably sorbing material and/or catalytic material. The sorbing material or sorbing agents take up and hold substances by either absorption or adsorption. In the present disclosure, a sorbing agent is present in the substrate pores to take up or remove selected constituents from a gaseous mixture under certain conditions. These constituents can then desorb under certain conditions which are predetermined. The term "sorbing material" or "sorbing agent" as used in the present disclosure can refer to one or a plurality of sorbing agents. Adsorption is the taking up of molecules by physical or chemical forces, termed respectively, physical or chemical adsorption. The term "adsorbing agent" according to the present disclosure refers to at least one adsorbing agent. There can be more than one type of adsorbing agent in the pores of the substrate wall. The specific adsorbers can vary depending on the application. Catalyst material according to the present disclosure refers to a catalyst metal or catalyst metal oxide on a support. Catalyst material includes also molecular sieves, such as zeolites when used in conversions such as, e.g., in cracking of hydrocarbons or oxidation, etc.

Example adsorbing agents that are suited for removal of hydrocarbons are those that adsorb at relatively low temperatures and desorb at relatively high temperatures. For example, adsorbing agents that adsorb hydrocarbons at engine start-up temperatures which are typically less than about 150° C., and desorb at engine operating temperatures which are typically greater than about 150° C. can be used. As disclosed in U.S. Pat. No. 5,260,035, hereby incorporated in its entirety as if fully set forth herein, examples of adsorbing agents which can be used as described herein without limitation are molecular sieves, activated carbon, transition aluminas, activated silicas, and combinations of these. Molecular sieves are crystalline substances having pores of size suitable for adsorbing molecules. Some example types of molecular sieves without limitation are carbon molecular sieves, zeolites, aluminophosphates, metallophosphates, silicoaluminophosphates, and combinations of these. Carbon molecular sieves have well defined micropores made out of carbon material.

In some embodiments, the active material can be without limitation, a metal exchanged or impregnated zeolite, for example, ZSM-5, beta-zeolites, mordenite, Y-zeolites, ultrastabilized Y-zeolites, aluminum phosphate zeolites, gmelinite, mazzite, offretite, ZSM-12, ZSM-18, Berryllophosphate-H, boggsite, SAPO-40, SAPO-41, combinations thereof, and mixtures thereof.

The active material will be referred to herein as a zeolite for convenience in the further detailed description. Zeolite, zeolite adsorber, zeolite catalyst, zeolite-based catalyst, and the like are used herein interchangeably for convenience according to these exemplary embodiments of the disclosure.

The TWC can include noble metal oxidation catalysts such as Pt, Rh, and/or Pd with a support such as alumina, ceria, titania, lanthana, zirconia etc. The oxidation catalyst serves to oxidize the hydrocarbons mainly, to innocuous products as carbon dioxide and water, which are suitable for passing into the atmosphere. The TWC can include a catalyst for conversion of $NO_x$, CO, and hydrocarbons to innocuous products. For example, the TWC can include noble metal as e.g., Pt, Pd, Rh, or combinations thereof on alumina, ceria, lanthana, zirconia, yttria, or combinations thereof. The TWC suited to the practice of exemplary embodiments of the present disclosure for stationary power plant exhaust conversion can include SCR catalyst for NOx reduction such as zeolite-based catalysts having transition metal or metals ion exchanged. Some example catalysts are Fe mordenite, Cu mordenite, ZSM-5 $H^+$ form, and $V_2O_5/TiO_2$. The TWC suited to the practice of exemplary embodiments of the present disclosure for auto exhaust conversion are, for example, Pt on ceria-alumina combined with Rh on zirconia. The Pt-ceria-alumina and the Rh-zirconia can be combined and applied at once, as in a single coating or they can be applied in separate coatings. Another suitable catalyst is Pt/Pd/Rh on gamma alumina with a rare earth oxide such as ceria.

Improvements in engine efficiencies can lead to lower exhaust gas temperatures. Lower temperatures may lead to lower conversion of exhaust gas constituents on catalysts. Hybrid electric vehicles (HEVs), engine starts and stops, other engine cycling, and the like can lead to more cold start HC emissions. As used herein, HC refers to hydrocarbons and volatile organic components (HC/VOC). The disclosed zeolite disposed inside the pores of a substrate and a three-way catalyst (TWC) disposed on the surfaces of the channel walls of the substrate as described herein can cost-effectively, efficiently, and passively reduce HC emissions under these types of conditions.

Figure 1B:
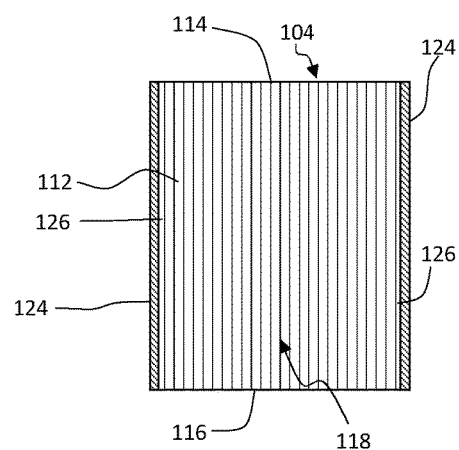
FIG. 1B is a schematic cross section through the honeycomb body of FIG. 1A according to these exemplary embodiments of the disclosure.
Figure 1C:
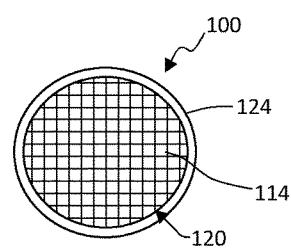
FIG. 1C is a schematic top view of the honeycomb body of FIG. 1A according to these exemplary embodiments of the disclosure.

FIG. 1A shows a honeycomb body 100 including a plurality of intersecting walls 110 that form mutually adjoining cell channels 112 extending axially in direction "A" between opposing end faces 114, 116. FIG. 1B shows a schematic cross section through the honeycomb body 100 of FIG. 1A. FIG. 1C shows a schematic top view of the honeycomb body 100 of FIG. 1A. "Cell" is generally used herein when referring to intersecting walls in cross section of the honeycomb body and "channel" is generally used when referring to a cell extending between the end faces 114, 116. Cell and channel may be used interchangeably as well as "cell channel". The top face 114 refers to the first end face and the bottom face 116 refers to the second end face of the honeycomb body 100 positioned in FIG. 1A, otherwise the end faces are not limited by the orientation of the honeycomb body 100. The top face 114 may be an inlet face and the bottom face 116 may be an outlet face of the honeycomb body 100 or the top face 114 may be an outlet face and the bottom face 116 may be an inlet face of the honeycomb body 100.

Cell density can be between about 100 and 900 cells per square inch (cpsi). Typical cell wall thicknesses can range from about 0.025 mm to about 1.5 mm (about 1 to 60 mil). For example, honeycomb body 100 geometries may be 400 cpsi with a wall thickness of about 8 mil (400/8) or with a wall thickness of about 6 mil (400/6). Other geometries include, for example, 100/17, 200/12, 200/19, 270/19, 300/4, 600/4, 400/4, 600/3, and 900/2. As used herein, honeycomb body 100 is intended to include a generally honeycomb structure but is not strictly limited to a square structure. For example, hexagonal, octagonal, triangular, rectangular or any other suitable cell shape may be used. Also, while the cross section of the depicted cellular honeycomb body 100 is circular, it is not so limited, for example, the cross section can be elliptical, square, rectangular, other polygonal shape, or other desired shape, and a combination thereof.

As used herein, porous ceramic body can refer to a honeycomb body, but is not so limited and can also refer to trough filters, radial flow filters, and the like. Ceramic body compositions are not particularly limited and can comprise major and minor amounts of cordierite, aluminum-titanate, mullite, β-spodumene, silicon carbide, zeolite and the like, and combinations thereof. As a further example, the ceramic honeycomb body can comprise an extruded zeolite or other extruded catalyst.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels extending axially from a first end face to a second end face. As used herein a ceramic honeycomb body includes ceramic honeycomb monoliths and ceramic segmented honeycomb bodies.

A co-extruded or an after-applied exterior skin may form an outer peripheral surface extending axially from a first end face to a second end face of the ceramic honeycomb bodies. Each channel of the honeycomb bodies defined by intersecting walls (webs), whether monolithic or segmented, can be plugged at an inlet face or an outlet face to produce a filter. When some channels are left unplugged a partial filter can be produced. The honeycomb body, whether monolithic or segmented, can be catalyzed to produce a substrate. A non-plugged honeycomb body is generally referred to herein as a substrate. The catalyzed substrate can have an after applied catalyst or comprise an extruded catalyst. Further, filters and partial filters can be catalyzed to provide multi-functionality. The ceramic honeycomb bodies thus produced are widely used as catalyst supports, membrane supports, as wall-flow filters, as partial filters, and the like or as combinations thereof for cleaning fluids such as purifying engine exhausts.

Figure 2:
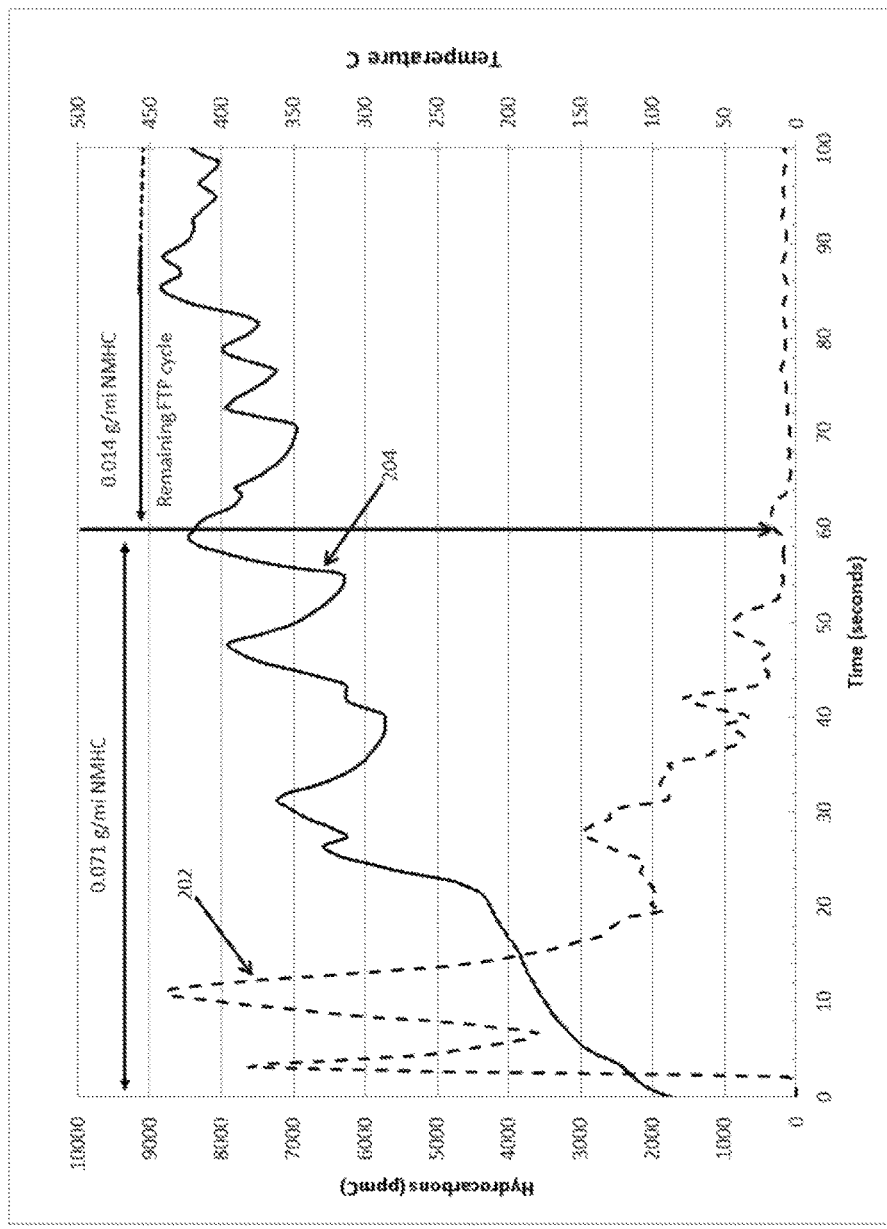
FIG. 2 is a graphical plot of cold start engine out HC emissions in ppm carbon over time in seconds during an Environmental Protection Agency (EPA) Federal Test Procedure-75 (FTP-75) cycle for a 3.8 L V6 engine in a vehicle.

When an internal combustion engine starts cold, a larger amount of unburned hydrocarbons and carbon monoxide can be emitted in the first minutes or less than when the internal combustion engine is warm. Also the larger amount of unburned hydrocarbons and carbon monoxide can pass through a cold catalyst without converting to $CO_2$, and $H_2O$. Close coupling the catalyst to the engine, for example, positioned within less than six inches (15.24 cm) of the engine exhaust manifold can reduce the un-burnt hydrocarbons (HC) and carbon monoxide (CO) by more quickly warming the catalyst. Nevertheless, cold start emissions can account for greater than 80% of the total emissions, for example, for a vehicle during a drive cycle. FIG. 2 illustrates the engine out cold start HC emissions in ppm carbon 202 (dashed line) and the engine out exhaust temperature 204 (solid line) over time in seconds during an Environmental Protection Agency (EPA) Federal Test Procedure-75 (FTP-75) cycle for a 3.8 L V6 engine in a vehicle.

After the catalyst is warmed up, after about 20-30 seconds, most of the emissions (HC, CO, NOx) get converted to $CO_2$, $H_2O$, and $N_2$ by the warm catalyst. To reduce catalyst warming time, lower mass close coupled substrates having high porosity and significantly lower density can be utilized. For example, the density can be about 30% less than conventional porous ceramic honeycomb substrates having similar cell density and wall thickness. For example, when cordierite density is taken as about 2.5 $g/cm^3$, a 400/6 conventional porous ceramic honeycomb substrate of cordierite can have a density of about 0.41 $g/cm^3$ with about 27 percent porosity (% P), whereas the 400/6 low mass porous ceramic honeycomb substrate of cordierite can have a density of about 0.31 $g/cm^3$ with about 45% P, a density of about 0.25 $g/cm^3$ with about 55% P, or a density of about 0.20 $g/cm^3$ with about 65% P. For example, a 600/3 conventional porous ceramic honeycomb substrate of cordierite can have a density of about 0.26 $g/cm^3$ with about 27% P, whereas the 600/3 low mass porous ceramic honeycomb substrate of cordierite can have a density of about 0.20 $g/cm^3$ with about 45% P, a density of about 0.16 $g/cm^3$ with about 55% P, or a density of about 0.12 $g/cm^3$ with porosity of 65%.

For another example, when the material is an aluminum titanate composite, for example, about 70% aluminum titanate phase having a density of about 3.7 $g/cm^3$ and about 30% strontium feldspar phase having a density of about 3.0 $g/cm^3$ thus giving the composite density of about 3.5 $g/cm^3$, a 400/6 conventional porous ceramic honeycomb substrate of aluminum titanate composite can have a density of about 0.57 $g/cm^3$ with about 27 porosity (% P), whereas the 400/6 low mass porous ceramic honeycomb substrate of aluminum titanate composite can have a density of about 0.43 $g/cm^3$ with about 45% P, a density of about 0.35 $g/cm^3$ with about 55% P, or a density of about 0.28 $g/cm^3$ with about 65% P. For example, a 600/3 conventional porous ceramic honeycomb substrate of aluminum titanate composite can have a density of about 0.36 $g/cm^3$ with about 27% P, whereas the 600/3 low mass porous ceramic honeycomb substrate of aluminum titanate composite can have a density of about 0.27 $g/cm^3$ with about 45% P, a density of about 0.22 $g/cm^3$ with about 55% P, or a density of about 0.17 $g/cm^3$ with porosity of 65%.

Having faster light-off compared to standard substrates can be provided by the lower mass substrates. These low mass high porosity substrates can reduce engine out emissions. Testing has shown that there is nearly a 10% HC reduction using such a low mass high porosity substrate for a close coupled catalyst.

Figure 3:
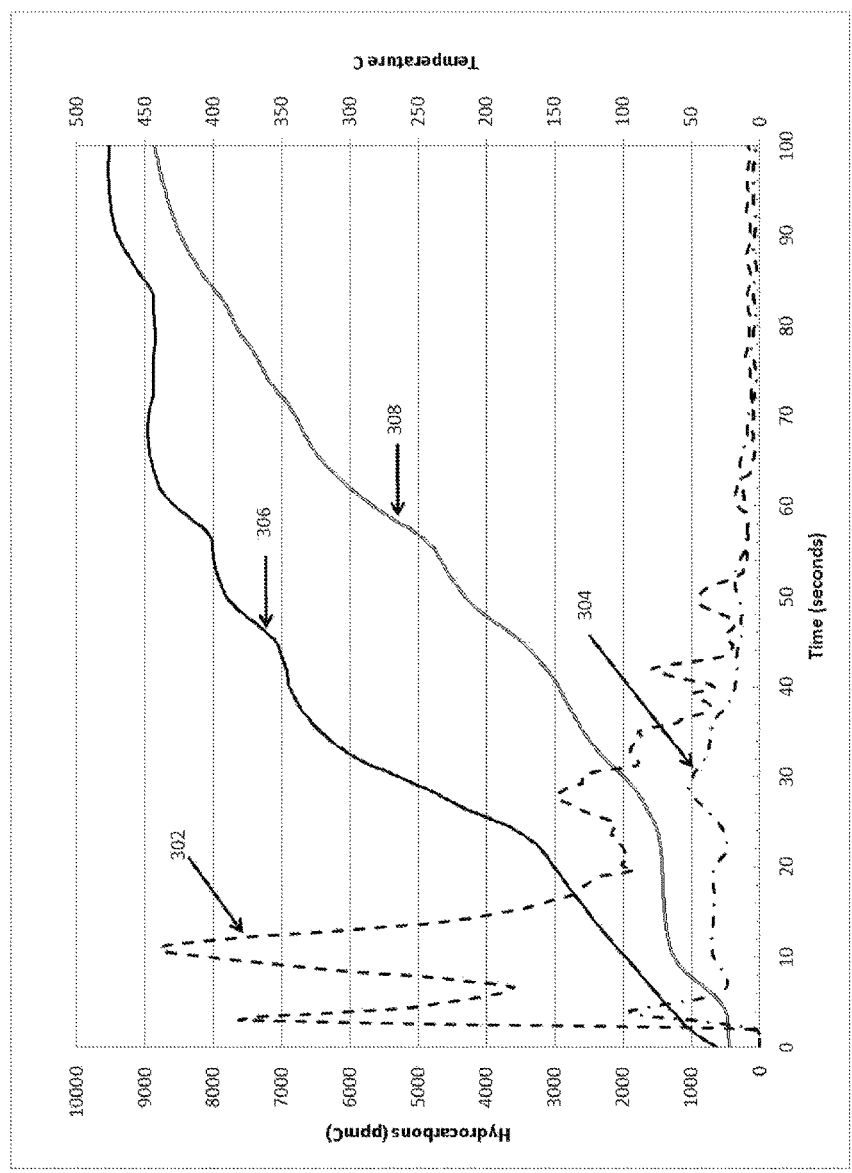
FIG. 3 shows a graphical plot of cold start HC emissions in ppm carbon over time in seconds before a zeolite adsorber and after the zeolite adsorber.

Another approach to reducing the cold start HC release includes providing zeolites to adsorb this large amount of HC. The low mass high porosity substrates provide pores that can accommodate zeolites disposed therein. Zeolites adsorb HC at low temperature and zeolites later release the HC at higher temperature to allow conversion to $CO_2$ and $H_2O$ by the warm catalyst. FIG. 3 shows that a substantial amount of HC is adsorbed over the zeolite catalyst. Curve 302 (dashed line) indicates HC before the zeolite adsorber and curve 304 (dot-dashed line) indicates HC after the zeolite adsorber. Curve 306 (solid line) indicates exhaust temperature before the zeolite adsorber and curve 308 (double solid line) indicates exhaust temperature after the zeolite adsorber.

For example, zeolite technology and zeolite coating can be used for diesel oxidation catalysts (DOC) in diesel vehicles. In such an application, it was found that zeolites adsorb >80% HC from cold start emissions. Thus, it is beneficial to take advantage of the properties of zeolites to adsorb HC to further reduce emissions during cold start and during normal driving cycle on fast light-off, low mass, high porosity substrates. The DOC catalysts can have a porosity of less than about 40%, for example, less than about 35%, a porosity of about 10% to about 30%, or even a porosity of about 15% to about 20%. The DOC catalysts can have a median pore size of about 7-10 µm, and the density of the substrate can be about 0.19-0.35 gm/cm$^3$ at a 400/4 geometry.

The fast light-off, low mass, high porosity substrates, can have a porosity of greater than about 40%, for example, greater than about 45%, greater than about 50% and even greater than about 55%. For example, high porosity low mass substrates can have a porosity between about 50% and 70%. The fast light-off high porosity low mass substrate can have a mass of about 190 gm for an about 4 inch (5.1 cm) diameter×about 4 inch (5.1 cm) length, about 600/3 geometry with about 55% porosity. By comparison a conventional substrate sample with about 34% porosity has a mass of about 290 gm for about the same size and geometry.

Figure 4:
FIG. 4 shows schematic cross sections through walls of the conventional substrate having about 34% porosity and the fast light-off, low mass, high porosity substrate having about 55% porosity.
Figure 4:
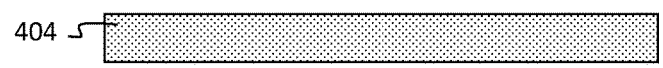

FIG. 4 shows schematic cross sections through walls of the conventional substrate having about 34% porosity and the fast light-off high porosity low mass substrate having about 55% porosity. The higher mass, lower porosity wall 402 is represented by a darker shade than the lower mass, higher porosity wall 404.

Exemplary embodiments of the disclosure are directed to a porous ceramic body having zeolite disposed in pores of walls of the porous ceramic body and three-way catalyst (TWC) disposed on wall surfaces of the porous ceramic body. In these exemplary embodiments this concept includes zeolite coated exclusively inside the pores of the substrate and TWC coated on the wall surfaces of the channels. Zeolite coated inside the pores of the substrate is referred to herein as "in wall" and TWC coated on the wall surfaces is referred to herein as "on wall". Optionally, when the porous ceramic body is an extruded zeolite, additional zeolite can be coated inside the pores of the substrate, but need not be.

Figure 5:
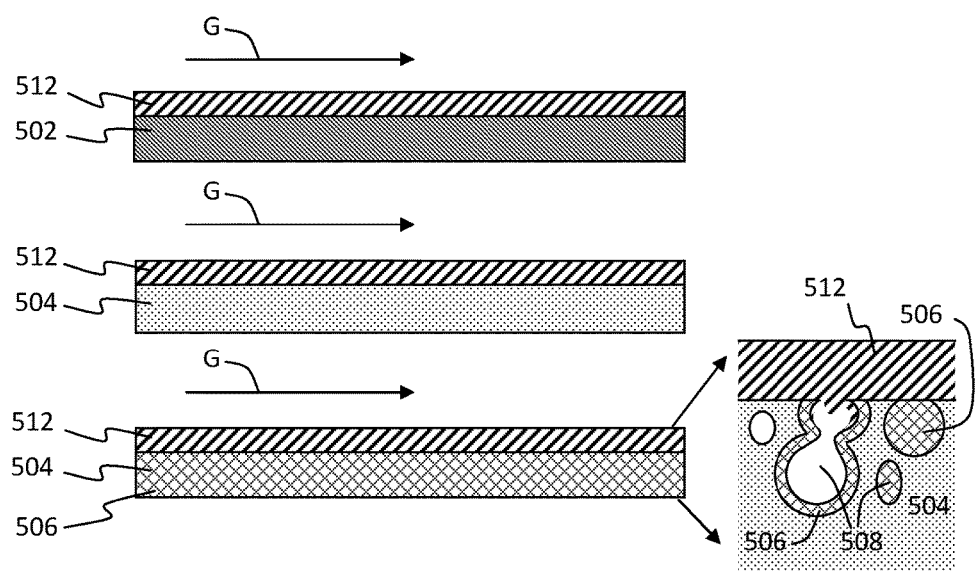
FIG. 5 shows schematic cross sections through walls of a conventional substrate having about 34% porosity, the fast light-off high porosity low mass substrate having about 55% porosity, and the fast light-off high porosity low mass substrate having zeolite disposed in the pores thereof according to exemplary embodiments of the disclosure.

FIG. 5 shows schematic cross sections through walls of the conventional substrate 502 having about 34% porosity, the high porosity low mass substrate 504 having about 55% porosity, and the high porosity low mass substrate 504 having zeolite 506 disposed in the pores 508 thereof indicated by a cross hatch fill. The higher mass, lower porosity wall 502 can have a larger median pore size than the lower mass, higher porosity wall 504. For example, the lower mass, higher porosity wall 504 can have a median pore size of about 7 to 10 µm. TWC 512 is coated on the channel walls 502, 504, and zeolite 506 is disposed in the pores 508 of the lower mass, higher porosity wall 504 illustrated in FIG. 5 insert. "G" represents the gas flow through the channels of the porous ceramic substrate, including, for example, HC, CO, NOx, O$_2$, etc.

Figure 6:
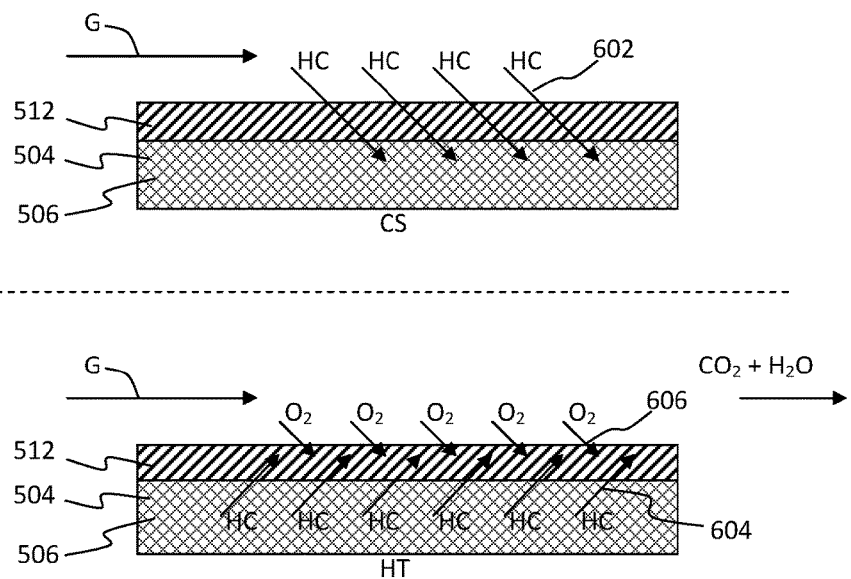
FIG. 6 schematically illustrates a process that shows HC adsorption in zeolite in fast light-off high porosity low mass substrate pores during cold start "CS" and desorption followed by oxidation over TWC on fast light-off high porosity low mass substrate channel wall surface once the substrate has reached a higher temperature "HT" where TWC catalytic activity occurs according to exemplary embodiments of the disclosure.

Fast light-off high porosity low mass substrate 504 with zeolite 506 disposed in the pores 508 and TWC 512 disposed on the walls will adsorb HC in the zeolite 506 during cold start of the cycle. As the TWC 512 catalyst gets heated these adsorbed HC desorb from zeolite 506, which is also heated, to get oxidized over the TWC 512 on the surface of the walls. There will be some temperature gradient between the surface TWC 512 and zeolites 506 in the pores 508 due to wall thickness and mass. This process is schematically illustrated in FIG. 6 that shows HC adsorption 602 in zeolite 506 in fast light-off high porosity low mass substrate pores 508 during cold start "CS" and desorption 604 followed by oxidation 606 over TWC 512 on high porosity low mass substrate 504 channel wall surface once the substrate has reached a higher temperature "HT" where TWC catalytic activity occurs. "CS" refers to colder condition during adsorption 602, while "HT" represents hotter substrate and catalyst during desorption 604 and oxidation cycle 606.

In these exemplary embodiments, the zeolite 506 disposed in the pores 508 can adsorb HC during cold start at and below a certain temperature and desorb HC above the certain temperature, and the TWC 512 disposed on the walls can decompose at least a portion of the desorbed HC in a temperature range having an upper limit above the certain temperature. For example, the certain temperature is a catalyst light-off temperature between about 100° C. and about 300° C., for example, a catalyst light-off temperature between about 100° C. and about 250° C.

According to these exemplary embodiments of the disclosure, zeolite can be in the pores and TWC can be disposed on the walls throughout the entire length of the cell channels of the low mass, high porosity substrate, alternatively zeolite can be disposed only in pores of a portion of the cell channels of the low mass, high porosity substrate. For example, a center portion extending axially and spaced apart from at least one end face may have zeolite disposed in pores of the channel walls. For example, a center portion extending axially and spaced apart from an input end face may have zeolite disposed in pores of the channel walls. In these instances, the TWC can be disposed on the portion having the zeolite disposed in the pores as well as the portion extending to the at least one end face. Having no zeolite disposed in the channels at an input end portion can provide low mass density allowing the substrate and TWC in such a portion to heat up more rapidly than if zeolite was present in the pores. Having no zeolite disposed in the channels at an outlet end portion can provide, for example, cost savings of catalyst material.

According to these exemplary embodiments of the disclosure, zeolite can be disposed only in pores of a first portion of the cell channels of the low mass, high porosity substrate and TWC can be disposed on at least a portion of the walls of the first portion of the cell channels of the low mass, high porosity substrate. For example, in some of these exemplary embodiments, the first portion of the walls can extend at least partially from the first end face to the second end face. For example, in some of these exemplary embodiments, the first portion of the walls can be spaced apart from the first end face by a first distance, and the first end face can be an inlet side of the porous ceramic honeycomb body. For example, in some of these exemplary embodiments, a second portion of the walls can extend from the first end face to the first portion of the walls. For example, in some of these exemplary embodiments, the walls extending between the first end face and the first portion of the walls can have a lower density than the first portion of the walls. For example, in some of these exemplary embodiments, the first portion of the walls can be spaced apart from the second end face by a second distance. For example, in some of these exemplary embodiments, the first distance and the second distance can be substantially the same or different. For example, the first distance and/or the second distance can be about 5% of the length of the low mass, high porosity substrate, for example, about 10%, about 15%, about 20%, about 25%, about 30%, about 40%, or even about 50% of the length of the low mass, high porosity substrate, for example, between about 10% and 50% of the length of the low mass, high porosity substrate depending on the catalyst light off temperature and HC adsorption capacity. For example, in some of these exemplary embodiments, a third portion of the walls extends from the second end face to the first portion of the walls.

The second and third portions can have no zeolite disposed inside pores of the walls and have TWC disposed on at least a portion of the second portion and/or the third portion.

Figure 7:
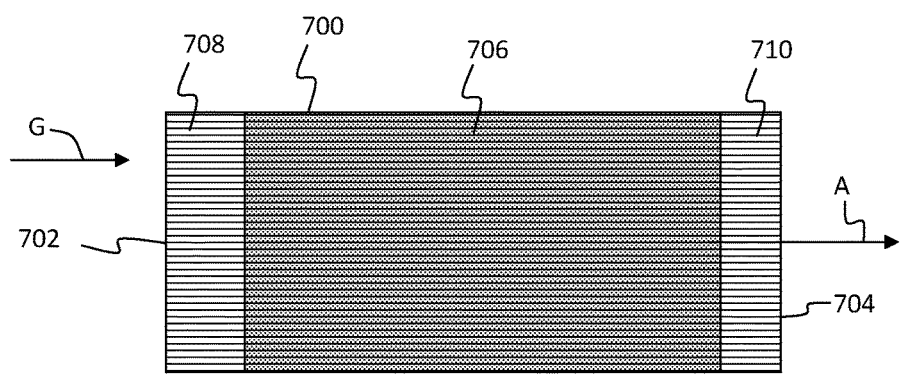
FIG. 7 illustrates a schematic cross section of a substrate having a first portion of the cell channels having TWC disposed on the walls, but no zeolite disposed in pores of the walls of the first portion, and a second portion having zeolite disposed in the pores of the walls and TWC disposed on the walls according to these exemplary embodiments.

FIG. 7 illustrates a schematic cross section of a substrate 700 having an input end face 702 and an output end face 704, a first portion 706 of the cell channels having zeolite disposed in the pores of the walls and second and third portions 708, 710 of the cell channels having TWC disposed on the walls, but no zeolite disposed in pores of the walls of the second and/or third portions 708, 710. The first portion 706 having zeolite disposed in the pores of the walls can have TWC disposed on the walls according to these exemplary embodiments of the disclosure. Such an arrangement provides an advantage of keeping the mass density low in the beginning, end or other desired section of the high porosity low mass substrate. The first portion 706, second portion 708, and/or third portion 710 design can be varied as needed to optimize HC adsorption and desorption cycles and manage the desired heat cycles.

EXAMPLES

Exemplary embodiments of the disclosure are further described below with respect to certain exemplary and specific embodiments thereof, which are illustrative only and not intended to be limiting.

A high porosity, low mass honeycomb body was coated with zeolite slurry comprising ZSM-5 and AL-20. The zeolite slurry was disposed only in the wall pores. After drying, the high porosity, low mass honeycomb body having zeolite disposed in wall was coated with three-way catalyst (TWC) as a layer on the channel wall surfaces. The sample was fired and tested for hydrocarbon (HC) adsorption and desorption/oxidation using $C_3H_6$ in accordance with exemplary embodiments of the disclosure. $C_3H_6$ was adsorbed under CS conditions and a significant portion was oxidized during heating cycle (HT). A comparative sample was coated with TWC only and then similarly fired and tested for hydrocarbon (HC) adsorption and desorption/oxidation.

Figure 8:
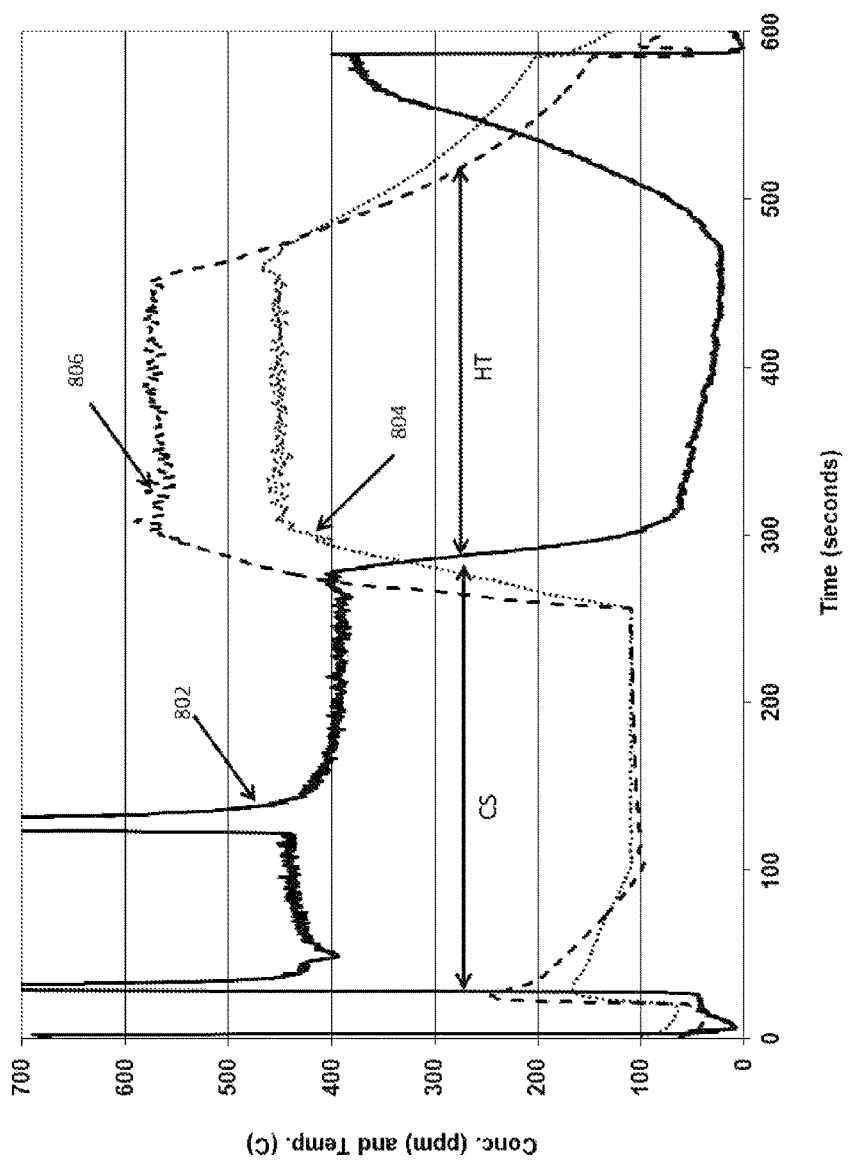
FIG. 8 shows a raw data plot of propylene concentration (ppm) 802 and inlet temperature (° C.) 804 as function of time (sec) for a comparative example having on wall TWC only.

The high porosity, low mass honeycomb body substrate having dimensions of about 1 inch (2.54 cm) diameter by about 3 inch (7.62 cm) length was coated with TWC (about 0.1 g/cc) using a vacuum coating process, without zeolite. An about 1 inch (2.5 cm) diameter by about 1 inch (2.4 cm) length sample of this comparative catalyzed sample was tested in a light off bench test with about 400 ppm propylene, 5000 ppm carbon monoxide, 500 ppm nitric oxide, 14% $CO_2$, 10% steam ($H_2O$), 1700 ppm hydrogen ($H_2$), balance nitrogen with space velocity of 90,000 ch/hr (ch refers to volumetric changes so that ch/hr refers to volumetric changes per hour herein) and a total flow of about 17.4 liters/min, using Fourier transform infrared spectroscopy (FTIR) detector. FIG. 8 shows a raw data plot of propylene concentration (ppm) 802, and catalyst on substrate inlet temperature (° C.) 804 and outlet temperature (° C.) 806 as function of time (sec) for the sample having on wall TWC. There was no removal of propylene before the catalyst heats up as shown in Region "CS". Propylene was oxidized at about 280 sec and the concentration decreased to less than about 50 ppm as shown in region "HT". The spikes in the propylene curve between about 0 and 100 sec and between about 100 and 200 sec are instrument anomalies caused by changing scale.

Figure 9:
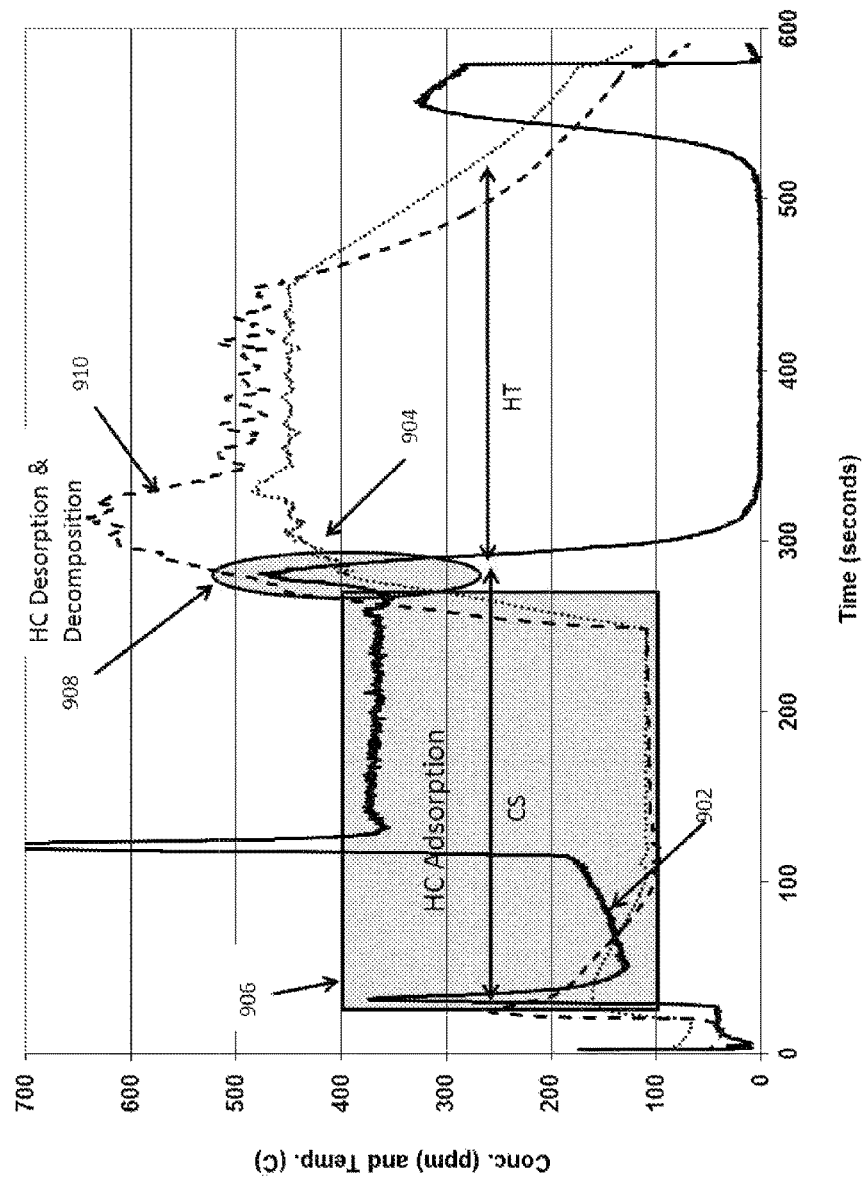
FIG. 9 shows a raw data plot of propylene concentration (ppm) 902 and inlet temperature 904 (° C.) as a function of time (sec) for an example having on wall TWC and zeolite disposed in wall according to exemplary embodiments of the disclosure.
Figure 10:
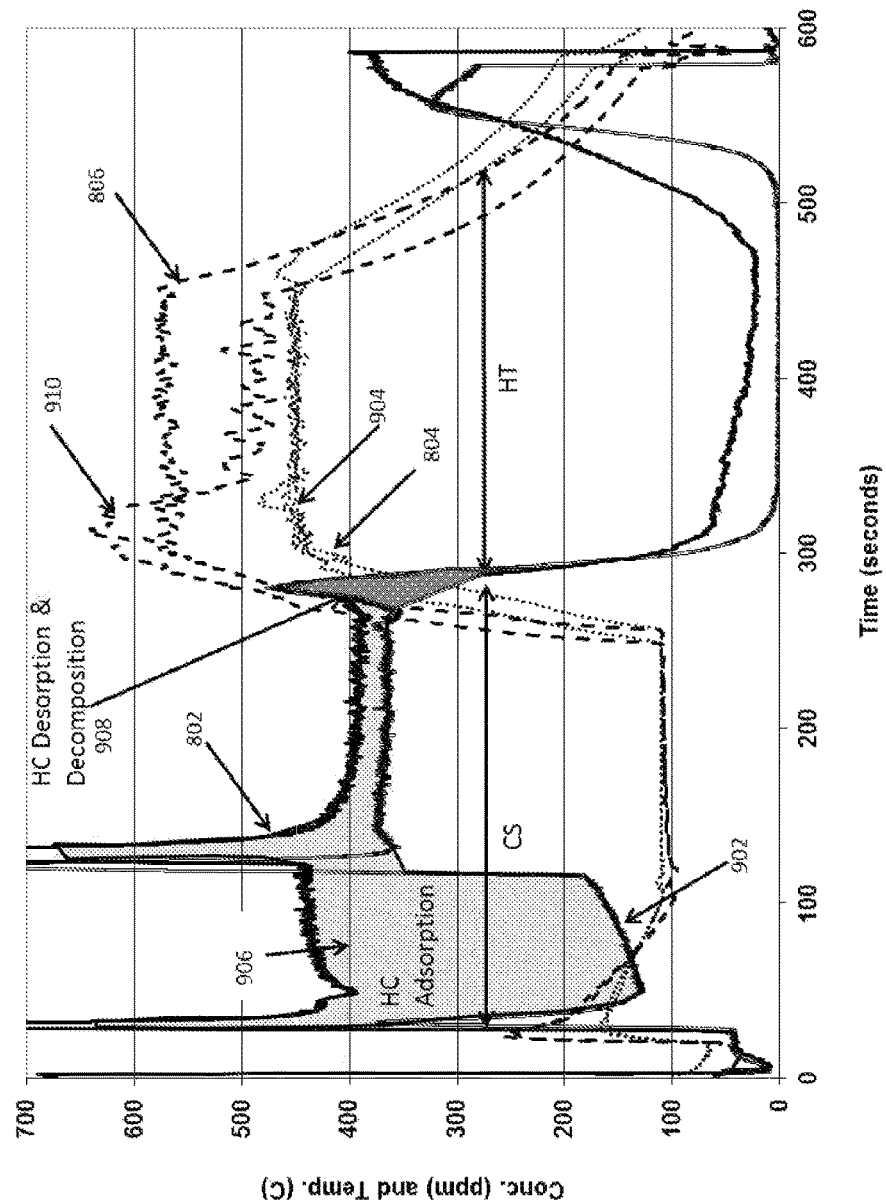
FIG. 10 provides an overlap view of the data from FIGS. 8 and 9 showing the two light-off tests for TWC only in the comparative example and ZSM-5 in pores and TWC on walls in the example of the exemplary embodiment of the disclosure.

The same high porosity, low mass honeycomb body substrate having dimensions of about 1 inch (2.5 cm) diameter by about 3 inch (7.6 cm) length was coated with ZSM-5 zeolite at about 0.1 g/cc loading in the pores followed by coating the same TWC as used in the comparative example at about 0.1 g/cc loading on the channel wall surfaces according to exemplary embodiments of the disclosure as described herein. A sample of about 1 inch (2.4 cm) diameter by about 1 inch (2.6 cm) length sample of this exemplary catalyzed sample was tested in a light off bench test with 400 ppm propylene, 5000 ppm carbon monoxide, 500 ppm nitric oxide, 14% $CO_2$, $H_2O$, 10% steam, 1700 ppm hydrogen, balance nitrogen with space velocity of 90,000 ch/hr and 17.9 liter/min total flow, using Fourier transform infrared spectroscopy (FTIR) detector as explained above for the comparative example. FIG. 9 shows a raw data plot of propylene concentration (ppm) 902, and inlet temperature (° C.) 904 and outlet temperature (° C.) 910 as a function of time (sec) for the example having on wall TWC and zeolite disposed in wall according to exemplary embodiments of the disclosure. Referring to FIGS. 8 and 9, it can be seen that the propylene concentration 902 is much lower at the beginning of the test from about 15 second start time in the exemplary embodiment of the disclosure indicating significant adsorption of propylene in ZSM-5 zeolite coated in the high porosity, low mass honeycomb body substrate pores. As the temperature heats up indicated by curve 904 and the catalyst gets heated the propylene concentration 902 decreases to zero indicating the oxidation reaction over TWC. In cold start region CS, HC adsorption occurred as indicated by box 906 (See FIG. 10 area between curves 902 and 802). As the TWC catalyst and zeolite were heated HC desorption and decomposition occurred as indicated by ellipse 908 (See FIG. 10 shaded area between curves 902 and 802). This example exothermic reaction shows the adsorption of propylene (HC) on zeolite and desorption and oxidation during heat up cycle over TWC on the surface.

FIG. 10 provides an overlap view of the data from FIGS. 8 and 9 showing the two light-off tests for TWC only in the comparative example and ZSM-5 in pores and TWC on walls in the example of the exemplary embodiment of the disclosure as described herein. The Figure comparing the two examples shows that nearly more than about 60% of the propylene is adsorbed and a small fraction (<10%) of the propylene desorbed and the rest of the hydrocarbon oxidized to $CO_2$. These examples clearly demonstrate the advantage of coating zeolite in pores of the fast light-off, high porosity, low mass honeycomb body substrate having TWC coated on wall to provide adsorption at low temperature followed by desorption and oxidation of adsorbed propylene over the TWC at high temperature.

Zeolites in automotive catalysts have been found by the applicant to adsorb a broad range of HC, including, for example, from $C_3$ to $C_{10}$ HC chains, alkanes, alkenes, aromatics, and the like. The zeolites have been found to remain stable and reliable for greater than about 100,000 miles (about 161,000 km). Combining the zeolites with the fast light-off, high porosity, low mass honeycomb body substrate deposited in the pores thereof and the TWC deposited on the walls demonstrates the concepts of the exemplary embodiments of the disclosure.

While not wishing to be bound by theory, the path of the HC to be adsorbed by the zeolite disposed in pores of the walls can be very short leading to rapid adsorption because the walls of the fast light-off, high porosity, low mass honeycomb body substrate are thin. As used herein, path simply refers to the path the gas takes to penetrate the substrate walls. In addition, the path of the desorbed HC to the TWC catalyst is also short for the same reason leading to efficient adsorption at low temperature and desorption and oxidation at high temperature. The TWC disposed on wall tends to heat to catalytic temperature prior to mass in wall. Thus, HC desorbed when the bulk of the wall heats up can be readily oxidized by the heated catalyst leading to efficient adsorption at low temperature and desorption and oxidation at high temperature. Furthermore, the thin porous wall heats more easily than a thicker, less porous wall such that the zeolite is efficiently utilized to release adsorbed HC to be oxidized.

In an exemplary embodiment of a diesel oxidation catalyst (DOC) having a lower porosity (% P), for example, in a range from 10% P to 35% P, according to this disclosure, zeolite can be disposed in pores in the wall of the DOC and TWC can be disposed on wall as described herein. In the instance of a DOC, the zeolite can adsorb HC when the engine cycle runs at a cool temperature followed by desorption and oxidation of HC as described and demonstrated above when the engine cycle runs at a hot temperature.

In some of these exemplary embodiments, an exhaust system for cleaning a fluid such as engine exhaust, can comprise the low mass substrate having high porosity or lower porosity, with zeolite disposed inside pores in wall and TWC disposed on wall of the substrate as described herein. The substrate may be disposed in a housing, which may be deployed in a fluid treatment system such as an exhaust system. The housing may be referred to as a can, and the process of disposing the ceramic honeycomb body in the can may be referred to as canning.

Figure 11:
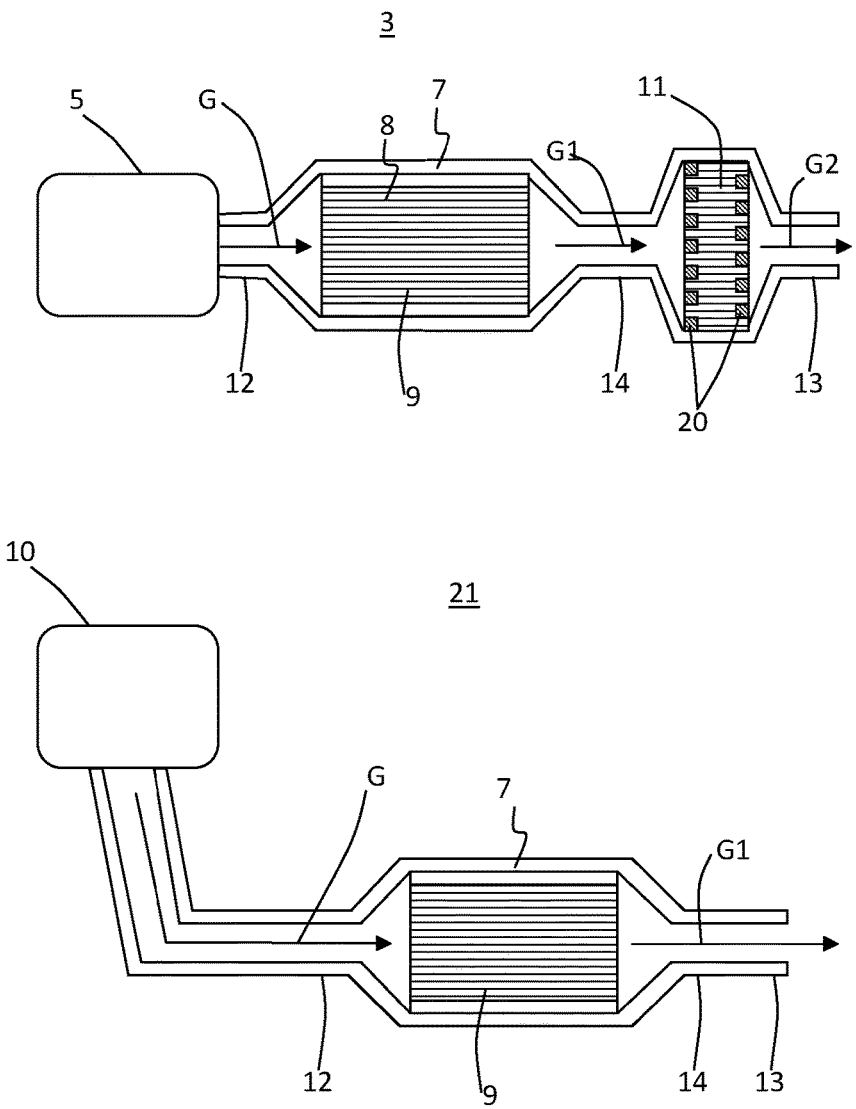
FIG. 11 shows exemplary embodiments of exhaust systems including a porous ceramic honeycomb body comprising a zeolite catalyst disposed in pores of the walls and a TWC disposed on surfaces of the walls.

FIG. 11 shows exemplary embodiments of exhaust systems including a porous ceramic honeycomb body comprising a zeolite catalyst disposed in pores of the walls and a TWC disposed on surfaces of the walls. The system 3 according to some of these embodiments can include an engine 5 or other source of fluid stream "G", such as exhaust gas stream, to be purified, a housing 7 having a chamber 8 to mount the substrate 9, a filter 11, and an outlet pipe 13, such as a tail pipe or exhaust stack. The housing 7 can have an inlet 12 to direct the gas stream G into the chamber 8 and through the channels of the substrate 9 disposed in the housing chamber 8 whereby the gas stream is purified as described above with regard to some of the exemplary embodiments. The purified gas stream G1 can exit the housing 7 through an outlet 14 and be filtered as it passes through walls of a through-wall filter 11 having inlet and outlet channels sealed with plugs 20 at respective outlet and inlet ends providing a purified and filtered gas stream emission from tail pipe 13. The filter 11 can be a diesel particulate filter or a gas particulate filter and can be upstream or downstream of the substrate 9 according to some of these exemplary embodiments. Furthermore, additional components of the exhaust system may include, for example, a selective catalytic reduction (SCR) catalyst and other compatible components.

In system 21, according to some of these exemplary embodiments, the substrate is located further from the engine 10 and without a particulate filter 11 such that purified gas stream G1 can directly exit the tail pipe 13. That is, in system 3, the substrate may be close coupled to the engine 5 to provide fast light-off as described above according to various exemplary embodiments of the disclosure. Likewise, while the substrate 9 may not be close-coupled to the engine 10 in the system 21, the system 21 may nevertheless include a filter, SCR catalyst, and the like, and combinations thereof. When the substrate 9 has a low mass density inlet portion as described above with reference to FIG. 7, a sorbing agent to adsorb cold start and/or cold cycle emission constituents and desorb the emission constituents at a temperature near or above a three way catalyst (TWC) light-off temperature, and such a TWC to decompose the desorbed emission constituents, according to some of the exemplary embodiments described herein, then the substrate may need not be so closely coupled to the engine, providing more flexibility in system design where space is limited, while still providing full drive cycle emissions below target regulations.

Figure 12:
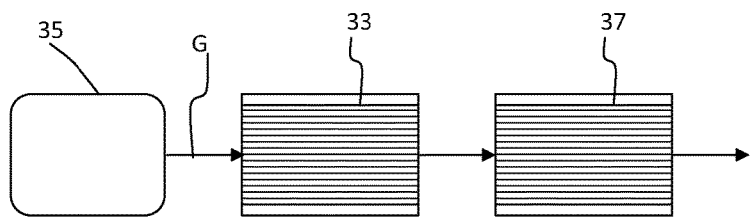
FIG. 12 is a schematic of exhaust systems when a sorbing agent is disposed in a porous ceramic honeycomb body and a TWC is disposed on surfaces of the walls of another porous ceramic honeycomb body and there is no porous ceramic honeycomb body comprising a sorbing agent disposed inside pores of at least a portion of the walls and a TWC disposed on wall surfaces of the portion of the walls.
Figure 12:
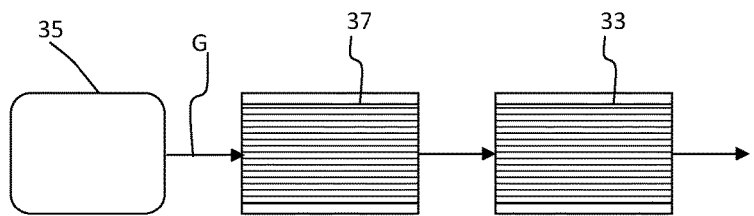
Figure 12:
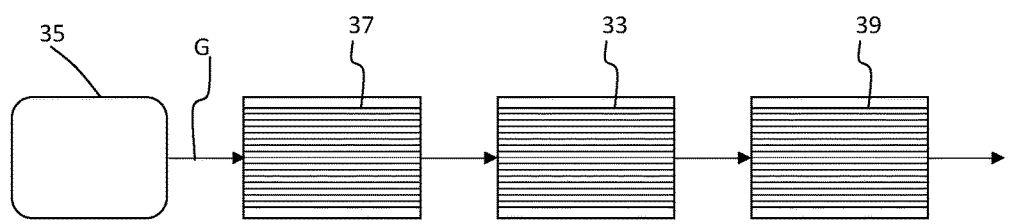

Furthermore, components not having the sorbing agent and TWC disposed according to these exemplary embodiments can lead to inefficiencies. For example, as shown in FIG. 12, a sorbing agent 33 disposed closer to an engine 35 than a TWC 37 would adsorb emission constituents in exhaust gas stream G, but the TWC 37 would be delayed in heating up, even, perhaps, reaching light off temperature after the sorbing agent desorbs the constituents at a desorbing temperature. On the other hand, a TWC 37 closer to the engine 35 would heat up faster, but would not be able to decompose the desorbed constituents. Further, a TWC 37 closer to the engine and an additional TWC 39 further from the engine than the sorbing agent 33 would add additional components and weight and require additional space.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A porous ceramic honeycomb body, comprising:
   a substrate of porous walls forming channels extending from a first end face to a second end face;
   an in wall zeolite catalyst disposed inside pores of a first portion of the walls; and
   a three way catalyst (TWC) disposed on wall surfaces of the first portion of the walls,
   wherein the first portion of the walls is spaced apart from the first end face by a second portion of the walls,
   wherein the first end face is an inlet side of the porous ceramic honeycomb body.

2. The porous ceramic honeycomb body of claim 1, wherein the second portion of the walls is substantially free of zeolite catalyst inside pores of the walls.

3. The porous ceramic honeycomb body of claim 1, wherein the second portion of the walls has a lower mass than the first portion of the walls.

4. The porous ceramic honeycomb body of claim 1, wherein TWC is disposed on at least a portion of the second portion of the walls.

5. The porous ceramic honeycomb body of claim 1, wherein the first portion of the walls is spaced apart from the second end face by a third portion of the walls.

6. The porous ceramic honeycomb body of claim 5, wherein the third portion of the walls is substantially free of zeolite inside pores of the walls.

7. The porous ceramic honeycomb body of claim 5, wherein TWC is disposed on at least a portion of the third portion of the walls.

8. The porous ceramic honeycomb body of claim 1, wherein the TWC comprises at least one of hydrocarbon oxidation, CO oxidation, and NOx reduction catalysts.

9. The porous ceramic honeycomb body of claim 1, wherein the zeolite comprises at least one of ZSM-5, beta-zeolites, mordenite, Y-zeolites, ultrastabilized Y-zeolites, aluminum phosphate zeolites, gmelinite, mazzite, offretite, ZSM-12, ZSM-18, Berryllophosphate-H, boggsite, SAPO-40, SAPO-41, combinations thereof, and mixtures thereof.

10. The porous ceramic honeycomb body of claim 1, wherein the substrate porosity is greater than about 50% porosity.

11. The porous ceramic honeycomb body of claim 1, wherein the median pore size is about 7-10 μm.

12. The porous ceramic honeycomb body of claim 1, wherein the density of the bare substrate is about 0.12-0.18 μm/cm$^3$ at a geometry of 600 cpsi (cells per square inch) and a wall thickness of 3 mils.

13. The porous ceramic honeycomb body of claim 1, wherein the zeolite is configured to adsorb hydrocarbon from an exhaust gas stream during cold start at and below a certain temperature and desorb hydrocarbon above the certain temperature, and
the TWC is configured to decompose at least a portion of the desorbed hydrocarbon in a temperature range having an upper limit above the certain temperature.

14. The porous ceramic honeycomb body of claim 13, wherein the certain temperature is a catalyst light-off temperature in a range from about 150° C. to about 250° C.

15. The porous ceramic honeycomb body of claim 1, wherein the substrate comprises cordierite, and the porosity is less than about 50% porosity, the median pore size is about 7-10 μm, and the density of the substrate is about 0.19-0.35 μm/cm$^3$ at a 400/4 geometry.

16. The porous ceramic honeycomb body of claim 1, wherein the zeolite is configured to adsorb hydrocarbon during a slow cycle at and below a certain temperature and desorb hydrocarbon above the certain temperature, and
the TWC is configured to decompose at least a portion of the desorbed hydrocarbon in a temperature range including an upper limit above the certain temperature.

17. The porous ceramic honeycomb body of claim 1, wherein the substrate comprises cordierite.

18. The porous ceramic honeycomb body of claim 1, wherein the porosity is less than about 50% porosity.

19. The porous ceramic honeycomb body of claim 1, wherein the median pore size is about 7-10 μm.

* * * * *

UNITED STATES PATENT AND TRADEMARK OFFICE
CERTIFICATE OF CORRECTION

PATENT NO. : 10,207,258 B2
APPLICATION NO. : 15/738434
DATED : February 19, 2019
INVENTOR(S) : Mallanagouda Dyamanagouda Patil It is certified that error appears in the above-identified patent and that said Letters Patent is hereby corrected as shown below:

In the Claims

In Column 15, Line 5, Claim 12, delete "$\mu m/cm^3$" and insert -- $gm/cm^3$ --, therefor.

In Column 16, Line 3, Claim 15, delete "$\mu m/cm^3$" and insert -- $gm/cm^3$ --, therefor.

Signed and Sealed this
Third Day of March, 2020

Andrei Iancu
*Director of the United States Patent and Trademark Office*